Figure 1:
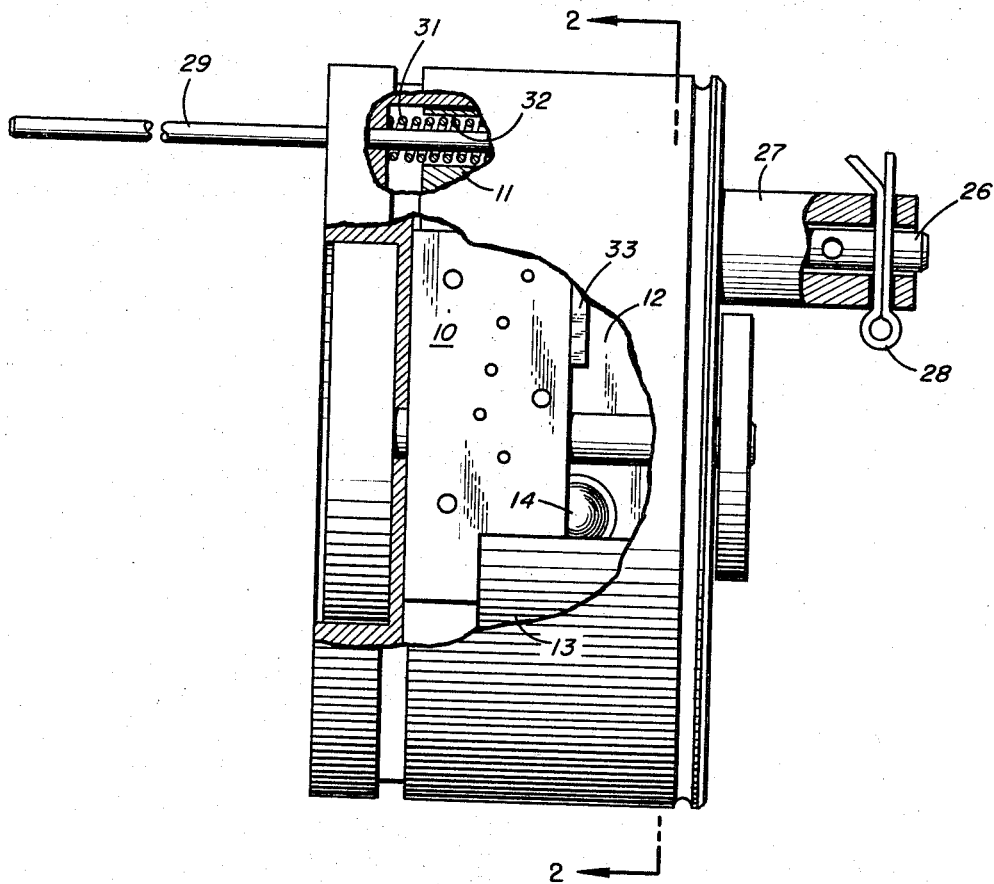

May 2, 1967 C. E. McFANN ET AL 3,316,841
SAFETY DEVICE FOR A BOMB FUZE
Filed July 29, 1965 2 Sheets-Sheet 1

Charles E. McFann
Arnold S. Munach
INVENTORS.

BY
ATTORNEY.

AGENT.

May 2, 1967  C. E. McFANN ET AL  3,316,841
SAFETY DEVICE FOR A BOMB FUZE
Filed July 29, 1965  2 Sheets-Sheet 2

Charles E. McFann
Arnold S. Munach
INVENTORS.

BY
ATTORNEY.
AGENT.

United States Patent Office 3,316,841
Patented May 2, 1967

3,316,841
SAFETY DEVICE FOR A BOMB FUZE
Charles E. McFann, Woodbine, and Arnold S. Munach, Rockville, Md., assignors to the United States of America as represented by the Secretary of the Navy
Filed July 29, 1965, Ser. No. 475,899
9 Claims. (Cl. 102—76)

The invention described herein may be manufactured and used by or for the Government of the United States of America for governmental purposes without the payment of any royalties thereon or therefor.

This invention relates to a safety and arming mechanism for a velocity-retarded gravity bomb and more particularly to a safing device for clearing the bomb fuze for arming a predetermined minimum period of time after bomb release and which is designed to immediately clear the fuze for arming even prior to expiration of the aforementioned predetermined period of time only if the velocity-retarding means fully deploys during a specified time interval after bomb release.

During certain low-level bombing operations, a released free-falling drop bomb will assume an initial trajectory path very close to the path of travel of the aircraft and can therefore explode substantially directly beneath the aircraft. Under such conditions it is necessary to provide the gravity bomb with a motion retarding means, such as pop-out fins or a parachute, for the purpose of decelerating the bomb to permit the aircraft to escape to a safe distance from the target before the bomb is detonated. Normally full deployment of the velocity-retarding means will sufficiently decelerate the free-falling bomb to give the aircraft enough time to escape the target area, and anything less than full deployment will not decelerate the bomb sufficiently in which case the aircraft is most likely to be damaged by the explosion. Devices have been provided, therefore which are capable of determining whether or not the velocity-retarding means are fully deployed and which are designed to accordingly control the duration of the fuze-arming timing interval, as for example to shorten the fuze arming time only if the motion retarding means have fully deployed. In certain of these low level bombing operations, however, it may be desirable to set the bomb fuze with as short as possible a fuze-arming timing interval, in which case the importance to the safety of the aircraft of full deployment of the motion retarding means as quickly as possible after the bomb is released is even more evident. Where such minimum settings are made it is essential that the retarding means not only function but that they do so almost immediately after bomb release so that retardation occurs almost throughout the entire bomb drop, otherwise the aircraft is obviously in jeopardy of being damaged.

It is therefore an object of the present invention to provide a device which will prevent bomb detonation on ground impact, with resulting aircraft loss or damage, when the unretarded or an only partially retarded bomb is released at low altitude and follows beneath the aircraft to ground impact.

Another object of the invention is to provide a safety device which will clear the fuze for arming only after the passage of a predetermined minimum period of time following bomb release unless the velocity-retarding means becomes fully deployed during a specified time interval after bomb release.

Still another object of the invention is to provide a safing device which will normally clear a bomb fuze for arming a predetermined minimum period of time after the bomb is released from the aircraft but is capable of clearing the fuze prior to that time if a given bomb deceleration occurs within a specified time interval following release, and which will not respond erroneously to bomb vibration or ground impact, but rather to steady state deceleration only.

With these objects in view, the device provided by the present invention combines an inertia-sensing element and a timer-regulator, and when installed into the bomb system becomes a working part of the bomb fuze. When proper bomb deceleration occurs, a g-weight will unlock an engagement rod connecting the arming mechanism of the fuze and the present safing device, allowing it to be rapidly retracted. If this deceleration occurs during a specified time interval after bomb release, the fuze will be cleared to arm. At all other times, except during the specified time interval, the g-weight is rendered immovable by a detent member linking the g-weight and the timer-regulator. If no deceleration is experienced by the bomb during the specified time interval, the device by means of its timer action will nevertheless clear the fuze to arm, but only after a safe, relatively long time interval has elapsed.

In the accompanying drawings, in which like reference numerals are used to designate similar parts throughout the several views, there is illustrated a preferred embodiment of the idea of this invention. The drawings, however, are for the purpose of illustration only, and are not to be taken as limiting the invention; the scope of which is to be measured entirely by the scope of the appended claims.

FIG. 1 is a side elevational view of the presently preferred embodiment of the invention having a portion of the cover removed showing the inertia-sensing element, an escapement assembly of the timer-regulator, and a captive ball detent between the inertia-sensing element and the escapement assembly.

Figure 2:
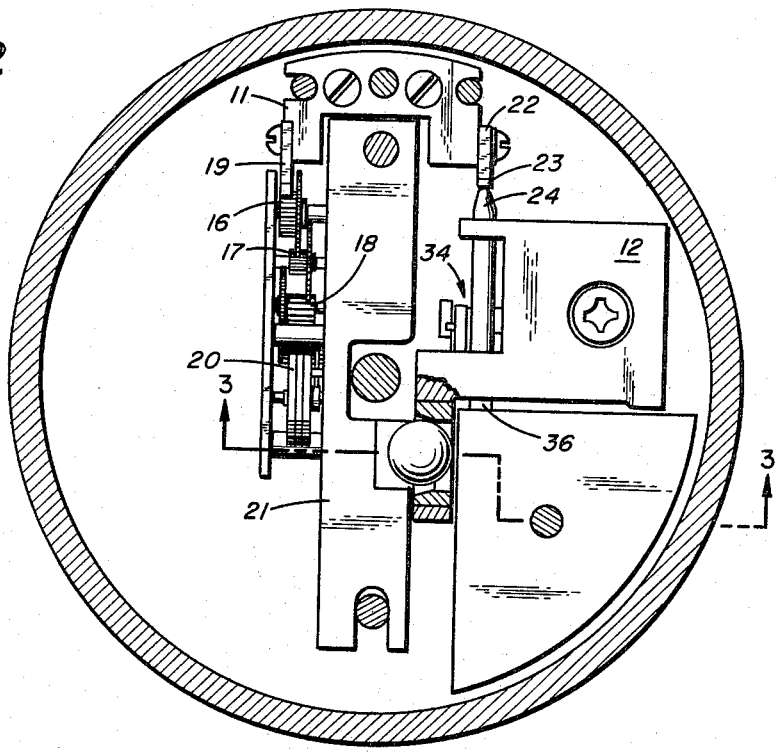
Figure 3:
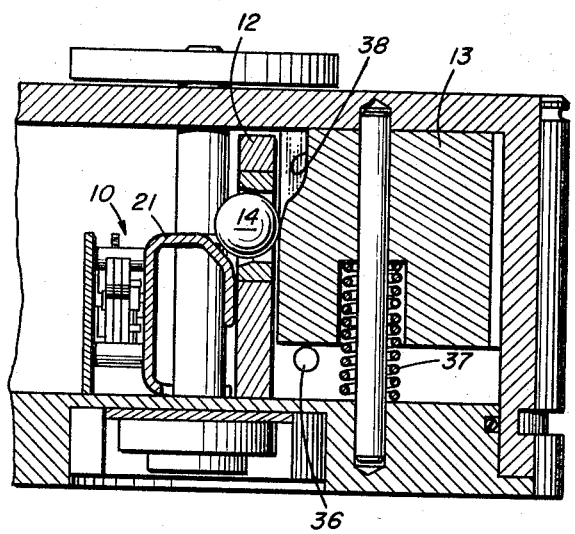

FIG. 2 is a sectional view, taken along the line 2—2 of FIG. 1, showing further details of the structure with respect to the timer-regulator, the inertia-sensing element, the detent member and linkage between the inertia element and the timer-regulator; and FIG. 3 is a sectional view, taken along the line 3—3 of FIG. 2, showing further details of the structure with respect to the captive ball detent between the inertia sensing element and the escapement assembly.

Referring now to the drawings, and more particularly to FIG. 1 thereof, the functioning of the retardation-sensing safety device can best be explained by describing the individual components and their respective uses. The components are arranged in a loop, starting with an escapement assembly 10, then a rack block 11, a detent block 12, g-weight 13 and a captive ball detent 14 between the g-weight and the escapement assembly.

The rate of travel of the rack block 11 is governed by the clutter type escapement 10, as best illustrated in FIG. 2, wherein it may be seen that a gear 16 driven by a gear rack 19 mounted on one side of the rack block 11 in turn drives a spur gear 17, causing rotation of an escape wheel 18 engaging an oscillating verge 20 within the assembly for restraining movement of the rack block and effectively controlling its rate of speed as it moves from the position shown in FIG. 1 to the right, or outwardly from the drawing as it is illustrated in FIG. 2. The escapement 10 is itself mounted on a movable plate 21 which is locked in the normal forward position (FIG. 1) by the ball detent 14 and the g-weight 13.

Mounted on the side of rack block 11 opposite the gear rack 19 is a plate 22 having a cam 23 positioned thereon for engagement with a cam follower pin 24. Secured on the aft end of the rack block 11 is a shaft 26 that projects through the cover and into a housing 27, to allow release of the rack block when an arming wire 28 extending transversely through aligned apertures in the housing 27 and shaft 26 is pulled on release of the bomb from the aircraft. An engagement rod 29 also secured to the rack block 11 projects forward through the case and down into the fuze arming rotor (not shown). A round wire compression drive spring 31 is placed forward of the rack block 11 and is compressed between the rack block and the support structure for the device when the shipping pin or arming wire 28 is in place. The spring 31 surrounds the rod 29 and extends into a bore 32 within rack block 11, also receiving the engagement rod 29, and abuts a shoulder therein formed by an aft plate member 33 so that when arming wire 28 is withdrawn it may drive the rack block 11 aftward at a speed regulated by the escapement.

The stationary detent block 12 contains a simple three bar linkage, one end of which is the follower pin 24 adapted to ride the cam surface on the rack block 11 and the other end of which serves as a g-weight detent 36. The action of the cam 23 and follower 24 as the rack block 11 moves slowly aft first withdraws the detent 36 from beneath the g-weight and then allows the detent to relock the g-weight. This function provides safety during transportation and discriminates against deceleration due to ground impact and vibration and shock associated with bomb and fin-deployment, as opposed to the steady-state deceleration caused by the fully-deployed bomb velocity-retarding system.

The g-weight 13 is so mounted within the support structure of the device that it is free to move forward only while the detent 36 is withdrawn. In an unretarded drop, g-weight 13 will not move forward because of a bias spring 37 and the escapement will govern the rate of withdrawal of the engagement rod 29 from the fuze rotor. In a retarded drop, however, g-weight 13 moves forward when subjected to the decelerating force of the fully deployed retarding means, overcoming the restraint of the bias spring 37, and releases the captive ball detent 14 to unlock the escapement plate 21. The exact nature of this operation may be readily understood by reference to FIG. 3, wherein it may be seen that the ball detent 14 is positioned within an aperture in a wall segment of the detent block 12, normally protruding out one end thereof to lock the movable escapement mechanism 10 in its inactivated position located forwardly of the support structure. g-Weight 13 normally maintains ball detent 14 in the position shown, but is provided with a cut-out portion 38 in one wall thereof so aligned with the ball detent 14 that when g-weight 13 is moved forwardly against the restraining spring 37, detent ball 14 is permitted to move into the region of the cut-out portion 38 thereby unlocking the movable escapement frame 10. Release of the escapement plate 21 allows the ungoverned force of the drive spring 31 to carry the escapement plate 21 and the rack block 11 aft, thus clearing the engagement rod 29 from the fuze rotor.

In an unretarded drop with the minimum selectable fuze arming time, the engagement rod 29 will not clear the fuze rotor; the rotor will jam against the engagement rod 29 when the fuze attempts to arm, and the unsafe situation aforedescribed will be prevented.

In operation, arming pin 28 is extracted upon release of the bomb from the aircraft, rack block 11 begins moving aft under the force of spring 31, and the escapement 10 begins timing out, effectively controlling the rate of movement of the rack block 11 within the support structure. During a specific time interval following bomb release, during which the follower pin 24 is in contact with the cam 23, the linkage 34 is activated whereby the detent pin 36 locking g-weight 13 in its normal aft position is withdrawn, freeing the g-weight for forward movement if sufficient decelerating forces are present. Therefore, if the bomb velocity-retarding means have fully deployed, the g-weight 13 will move forward, ball detent lock 14 will be released, and the escapement assembly 10 will pop up simultaneously with the engagement rod 29 thereby clearing the fuze rotor for arming.

At any other time, however, either before or after the period of time when the follower pin 24 is riding over the cam 23, the linkage 34 remains inactive and the g-weight 13 is held fast in its aft position by the detent pin 36. In this case, the engagement rod 29 will be extracted from the fuze rotor in the predetermined minimum period of time established by the normal rate of travel of rack block 11, which is governed by the escapement 10.

Thus, regardless of whether the bomb is retarded or unretarded during its drop, unless retardation occurs during the specified time interval, that is during the incremental portion of the travel of rack block 11 in which the follower pin 24 is riding over the cam 23, arming of the fuze will be delayed at least a predetermined minimum period of time. Only if retardation occurs during the aforementioned specified time interval will the escapement assembly be permitted to pop up immediately, simultaneously withdrawing the engagement rod 29, to clear the fuze rotor for arming prior to completion of the predetermined minimum period of time following bomb release.

The present device gives protection to aircraft during low-level bombing operations. The entire device is unique in the achievement of its goals, which are peculiar to particular weapons and to particular operations. A novel feature of the device is the manner in which the conventional verge escapement is employed. It governs the rate of motion of the engagement rod so that a predetermined minimum period of time is required for full rod extraction when there are insufficient g-forces present. However when sufficient g-forces are present in the prescribed direction during a specified time interval following bomb release, then only is the escapement action nullified. This is achieved by permitting the escapement assembly to pop up simultaneously with the engagement rod. The rack on the rack block does not interact with the gear train to the escapement, and the gear train and rack remain motionless relative to one another as the rack block and escapement assembly move aft. The engagement rod therefore has no restraint and executes its motion in only a few milliseconds.

Obviously, many modifications and variations of the present invention are possible in light of the above teachings. It is therefore to be understood that, within the scope of the appended claims, the invention may be practiced otherwise than as specifically described with respect to the aforesaid preferred embodiment.

What is claimed is:

1. A safety device for a fuze in a velocity-retarded gravity bomb comprising:
   a rod engaging said fuze and movable from a first position wherein it may prevent fuze arming to a second cleared-for-arming position,
   stored energy spring means for moving said rod from said first position to said second position,
   first means for preventing movement of said rod from said first position to said second position prior to the expiration of a predetermined minimum period of time,
   and second means responsive only to deceleration occurring during a specified incremental portion of said predetermined minimum period of time for inactivating said first means and permitting rapid movement of said rod to said second position by said stored energy spring means.

2. The device of claim 1 wherein said second means comprises a spring biased inertia weight member having a ball-detent lock means associated therewith for maintaining said first means active throughout said predetermined minimum period of time,
   and means for releasing said ball lock when said weight member moves against the spring under the decelerating forces of bomb retardation.

3. The device of claim 2 wherein said first means comprises an escapement assembly mounted on a plate movable with said rod and releasably secured in a first position by said ball detent locking means.

4. A safety device for a fuze in a velocity-retarded gravity bomb for clearing the fuze for arming a predetermined minimum period of time after the bomb is released from the aircraft which will immediately clear the bomb fuze for arming even before completion of said predetermined minimum period of time only if retardation occurs during a specific time interval after bomb release comprising:

a rod engaging said fuze and movable from a first position wherein it may prevent fuze arming to a second cleared-for-arming position, escapement means mounted on a movable plate and engaged with said rod for normally retarding and controlling the rate of movement of said rod, stored energy spring means urging said rod to move from said first position to said second position and resiliently biasing the escapement movable plate for movement therewith, a weight supported for sliding movement away from a rest position responsive to deceleration, spring means biasing said weight toward said rest position, means for locking said weight in said rest position, means associated with said rod for unlocking said weight locking means only during a specified incremental portion of the travel of said rod and for relocking said weight locking means when the rod has traversed said portion of travel, and means connecting said weight to said movable plate of said escapement means for preventing movement of said plate when said weight is in its rest position and for permitting movement of said plate when said weight moves in response to the decelerating forces of bomb retardation.

5. The device of claim 4 including means for locking said rod in said first position until the bomb is released from the aircraft.

6. The device of claim 4 including a gear rack mounted on said rod in engagement with said escapement mechanism.

7. The device of claim 4 wherein said weight locking means includes a detent movable into and out of the path of movement of said weight.

8. The device of claim 7 including a plate mounted on said rod for movement therewith and having a cam surface thereon, a cam follower biased against said plate, and linkage connecting said follower and said detent for moving said detent out of the path of movement of said weight only while said follower contacts said cam surface and for returning the detent to the weight locking position when the follower has passed over the cam surface as the rod and the plate mounted thereon move from said first to said second position.

9. The device of claim 4 wherein said means connecting said weight to said movable plate of said escapement means is a ball detent lock.

No references cited.

BENJAMIN A. BORCHELT, *Primary Examiner.*

G. H. GLANZMAN, *Assistant Examiner.*